United States Patent [19]

Mizutani et al.

[11] Patent Number: 4,998,607
[45] Date of Patent: Mar. 12, 1991

[54] FLUID COUPLING HAVING DAMPED BIMETALLIC SPRING

[75] Inventors: Kenichiro Mizutani; Seiya Tanaka, both of Kariya; Atsushi Ohmi, Anjo, all of Japan

[73] Assignee: Aisin Seiki Kabushiki Kaisha, Kariya, Japan

[21] Appl. No.: 463,292

[22] Filed: Jan. 10, 1990

[30] Foreign Application Priority Data

Jan. 20, 1989 [JP] Japan .......................... 01-004394[U]

[51] Int. Cl.[5] .................... F16D 35/00; F16D 43/25
[52] U.S. Cl. ........................ 192/58 B; 192/30 V; 192/82 T
[58] Field of Search ................. 192/58 B, 82 T, 30 V

[56] References Cited

U.S. PATENT DOCUMENTS

| | | | |
|---|---|---|---|
| 3,055,473 | 9/1962 | Oldberg | 192/58 B |
| 4,103,765 | 8/1978 | Tinholt | 192/82 T X |
| 4,185,726 | 1/1980 | Rohrer | 192/58 B |
| 4,328,881 | 5/1982 | Rohrer | 192/58 B |
| 4,380,279 | 4/1983 | Masai | 192/82 T X |
| 4,431,098 | 2/1984 | Hayashi et al. | 192/58 B X |
| 4,505,367 | 3/1985 | Martin | 192/85 B |

FOREIGN PATENT DOCUMENTS 1409798  7/1988  U.S.S.R. ........................ 192/58 B

*Primary Examiner*—Rodney H. Bonck
*Attorney, Agent, or Firm*—Oblon, Spivak, McClelland, Maier & Neustadt

[57] ABSTRACT

A fluid coupling includes a casing supported by a drive shaft, a cover fixed to the casing to form a chamber, a partition plate fixed to the cover to partition the chamber into a reservoir and an operation chamber, a rotor disposed in the operation chamber, a valve plate operated to open or close a passage provided in the partition plate, a stud supported by the cover and fixed to the valve plate and a bimetal spring fixed to the stud on an inner end and to the cover on an outer end thereof. A damper is disposed between the cover and the bimetal spring and includes a rubber block and a bracket fixed to a part of the cover. The damper prevents the vibration and breakage of the bimetal spring.

5 Claims, 3 Drawing Sheets

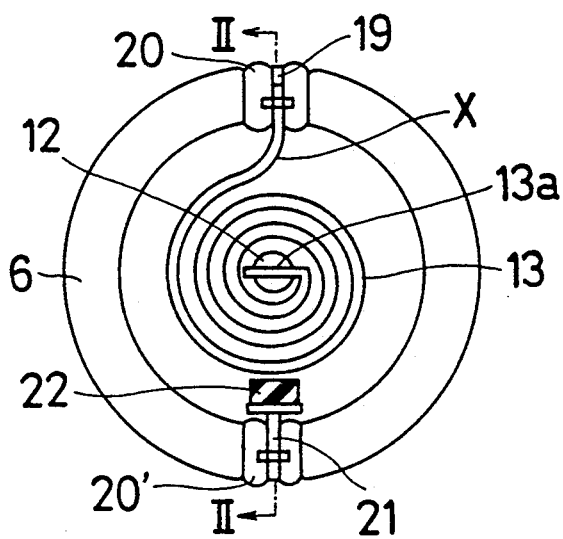
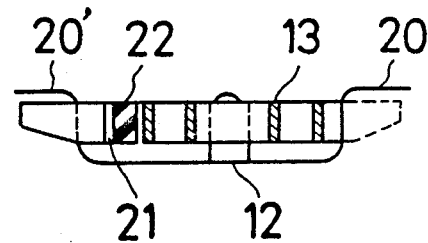
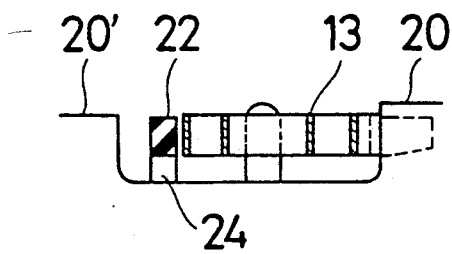
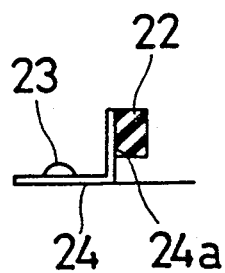
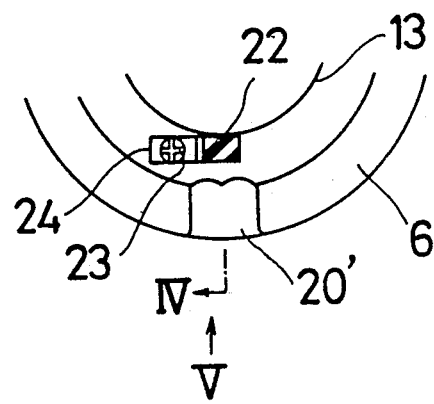
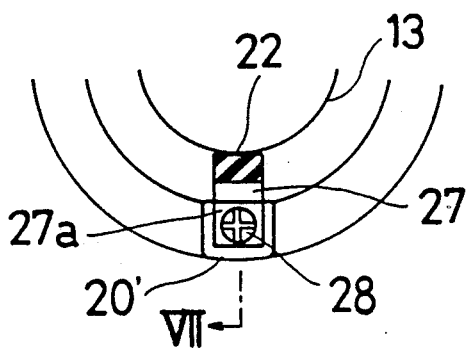

FLUID COUPLING HAVING DAMPED BIMETALLIC SPRING

BACKGROUND OF THE INVENTION

1. Field of the Invention

The invention relates to a fluid coupling with a damping mechanism for a bimetallic spiral spring, which coupling may be used in an automobile.

2. Description of the Related Art

In the conventional coupling with a damping mechanism for a bimetal spring in FIGS. 12 and 13, a casing 3 is supported on a drive shaft 1 by a bearing 4, and a cover 6 is formed to the casing 3 to form a chamber therebetween. An O-ring 7 is set between the contact faces of the casing 3 and a cover 6. A partition plate 8 is fixed to the cover 6 in order to partition the chamber into a reservoir 10 and an operation chamber 9. A rotor 2 is fixed to the drive shaft 1 and is disposed in the operation chamber 9. On both opposing faces of the casing 3 and the rotor 2 are formed labyrinth grooves 5. The partition plate 8 has a passage 11 so that the fluid in the reservoir 10 can enter the operation chamber 9.

A rod 12 is supported by the cover 6. On one end of the rod 12 is fixed a valve plate 14, and on the other end of the rod is fixed an inner end 13a of a bimetal spring 13. The outer end 19 of the bimetal spring 13 has a bent portion and is fixed to a boss 20 formed on the cover 6. The bimetal spring 13 responds to the temperature of the atmosphere behind a radiator (not shown) so that the valve plate 14 moves to open and close the passage 11.

A plate 15 is fixed to the cover 6 by screws 15a, and has projection 16 with a rubber block 17 adhered thereto and contacting the bimetal spring 13. The plate 15 has holes 18, so that the bimetal spring 13 can respond to the temperature of the air flowing through the holes 18.

The bimetal spring 13 vibrates in resonance with the vibrations of the engine, suspension, etc. and it is possible for the bimetal spring 13 to break, particularly at the bent point A in FIG. 13, unless a damping mechanism such as that comprising the rubber block 17 is provided. However, when the plate 15 with the rubber block 17 is attached to the cover 6, it is difficult to know the degree of contact of the rubber block 17 with the bimetal spring 13, because the contact portions of the rubber block 17 and the bimetal spring 13 are obstructed by the plate 15. Therefore, excessive adjustment time is necessary. Further the plate 15 reduces the temperature responsiveness of the bimetal spring 13, in spite of the holes 18, because a sufficient air-flow to the bimetal spring 13 cannot be assured by the holes 18.

SUMMARY OF THE INVENTION

It is an object of the invention to provide a fluid coupling which obviates the above mentioned drawbacks of a conventional system.

In order to accomplish the above and other objects, a fluid coupling is comprised of a casing supported by a drive shaft, a cover fixed to the casing to form a chamber, a partition plate fixed to the cover to partition the chamber to a reservoir and an operation chamber, a rotor disposed in the operation chamber, a valve plate operated to open or close a passage in the partition plate, a stud supported by the cover and fixed the valve plate, a spiral bimetal spring fixed to the stud on an inner end and to the cover on an outer end, and a damping means disposed between the cover and the bimetal spring. The damping means comprises a rubber block and a bracket fixed to the cover. The bracket does not overlie the damping means at an axial side of the damping means with respect to the axis of rotation of the rotor. Therefore, a contact between the damping means and the bimetal spring is visible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a front view of a first embodiment of a damper according to the invention;

FIG. 2 shows a sectional view of the embodiment of FIG. 1 as seen along line II—II of FIG. 1;

FIG. 3 shows a partial front view of a second embodiment of a damper according to the invention;

FIG. 4 shows a sectional view of the embodiment of FIG. 3 as seen along line IV of FIG. 3;

FIG. 5 shows a detail of the embodiment of FIG. 3 as seen along line V in FIG. 3;

FIG. 6 shows a partial front view of a third embodiment of a damper according to the invention;

DETAILED DESCRIPTION OF THE PREFERRED EMBODIMENTS

Figure 12:
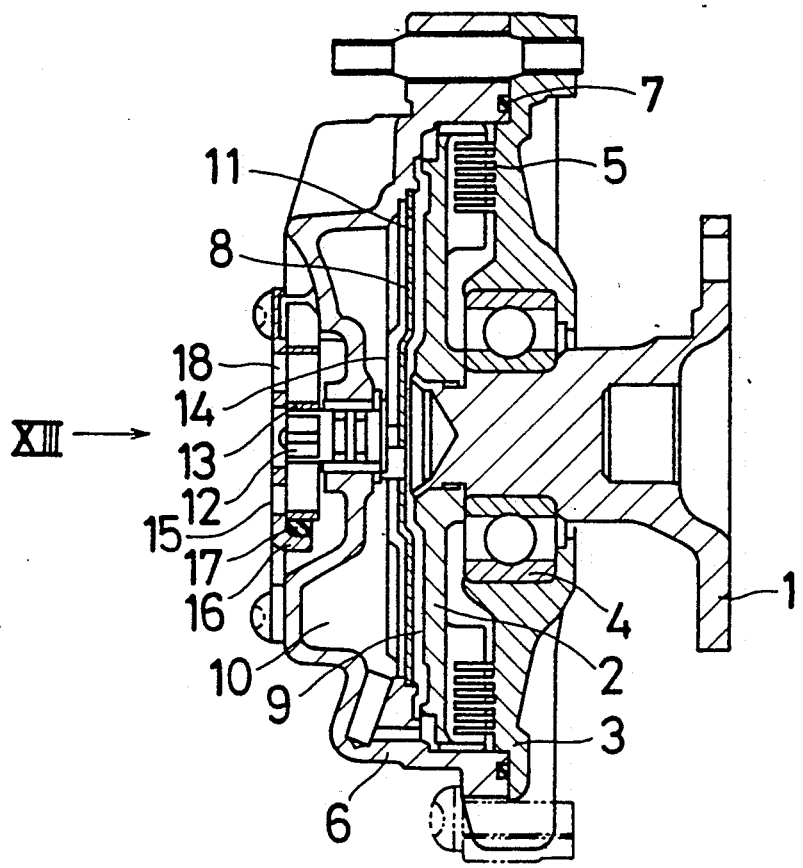
FIGS. 12 and 13 are respective sectional and partial end views of a conventional device.
Figure 13:
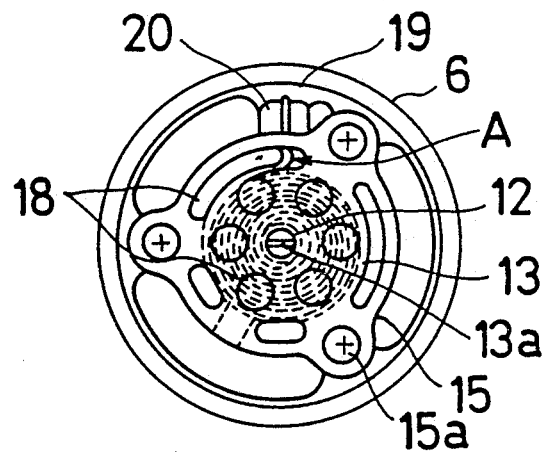

An apparatus according to the invention has a different damper than does the conventional fluid coupling as shown in FIGS. 12 and 13.

In a first embodiment shown in FIGS. 1 and 2, a spiral bimetal spring 13 is fixed to a stud 12 on its inner end 13a and to a lug 20 of a cover 6 on its bent outer end 19. A T-shaped bracket 24 is secured or fit tightly to an opposite lug 20' of the cover 6. A rubber block 22 is fixed by adhesive or welding to the T-shaped bracket 21 so as to be facing the bimetal spring 13. The rubber block 22 contacts the bimetal spring 13 or is slightly spaced from the bimetal spring 13 by an amount that is sufficiently small that it contacts the bimetal spring 13 during vibration of the spring.

The term "rubber" as used herein is not limited to natural rubber but includes all elastomeric materials capable of absorbing vibrations.

In a second embodiment shown in FIGS. 3, 4 and 5, an L-shaped bracket 24 is fixed to the cover 6 by a screw 23. A rubber block 22 is fixed to an angled supporting surface 24a facing the bimetal spring 13.

Figure 7:
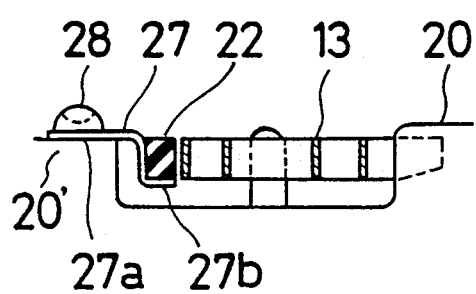
FIG. 7 shows a sectional view of the embodiment of FIG. 6 as seen along line VII of FIG. 6.

In a third embodiment shown in FIGS. 6 and 7 one leg 27a of a Z-shaped bracket 27 is fixed to a lug 20' of the cover 6 by a screw 28. A rubber block 22 is fixed to the other leg 27b of the Z-shaped bracket 27.

Figure 8:
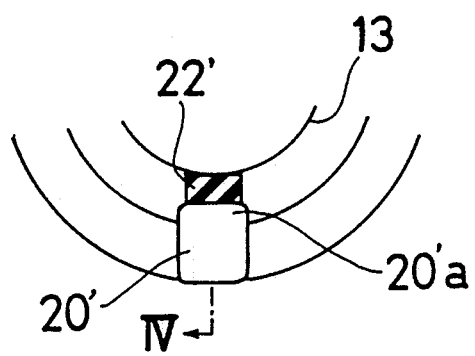
FIG. 8 shows a partial front view of a fourth embodiment of damper according to the invention.
Figure 9:
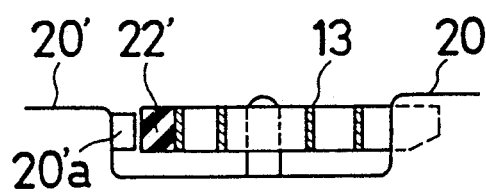
FIG. 9 shows a sectional view of the embodiment of FIG. 8 as seen along line IX of FIG. 8.

In a fourth embodiment shown in FIGS. 8 and 9, a rubber block 22' is fixed to the outer face of the outer turn of a bimetal spring 13 by an adhesive or by welding. A projection 20'a facing the rubber piece 22' is formed on a lug 20' of the cover 6.

Figure 10:
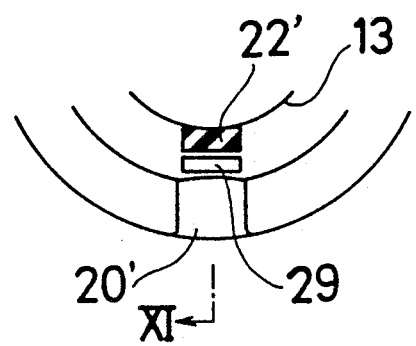
FIG. 10 shows a partial front view of a fifth embodiment of a damper according to the invention.
Figure 11:
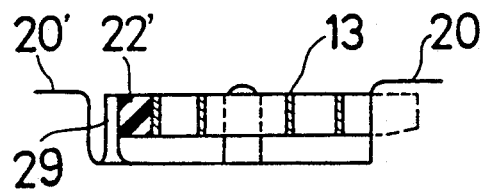
FIG. 11 shows a sectional view of the embodiment of FIG. 10 as seen along line XI of FIG. 10.

In a fifth embodiment shown in FIGS. 10 and 11, a rubber piece 22' is fixed to the outer face of the outer turn of a bimetal spring 13. A projection 29 is formed on the cover 6 spaced from a lug 20'. In each embodiment, the rubber block or piece is set to contact the opposite part (the bimetal spring, the lug or the projection) or to be slightly spaced therefrom by a distance sufficiently small that contact occurs upon vibration of the spring during vehicle operation, so that the vibration of the bimetal spring is restrained. Therefore, at X in FIG. 1, breakage of the bimetal spring is prevented.

Because the bracket or projection in the invention is smaller than the plate 15 of the conventional damper it is easy to adjust the distance or contact-degree between the rubber piece and the bimetal spring or the cover (the lug, the projection). Since the bracket or projection does not axially overlie the rubber block at an axial side thereof with respect to the axis of rotation of the rotor, a contact between the damping means and the bimetal spring is visible. Additionally, the bracket or projection does not hinder air-flow, and the bimetal spring responds more rapidly to changes in the temperature of the air-flow.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A fluid coupling comprising:
   a casing supported by a drive shaft;
   a cover fixed to said casing to form a chamber;
   a partition plate having a passage and dividing said chamber into a fluid reservoir and an operation chamber;
   a rotor disposed in said operation chamber;
   a valve plate operable to selectively open and close said passage in said partition plate;
   a stud supported by said cover and fixed to said valve plate such that rotation of said stud operates said valve plate; and
   a bimetal spring having an inner end fixed to said stud and an outer end fixed to said cover for rotating said stud in response to temperature changes; and
   damping means disposed between said cover and said bimetal spring, said damping means comprising a rubber element mounted on a bracket fixed to a part of said cover, said rubber element being positioned sufficiently close to said bimetal spring that said rubber element engages said bimetal spring at least during vibration of said bimetal spring, wherein said bracket does not overlie said damping means at an axial side of said damping means with respect to the axis of rotation of said rotor, whereby a contact between said damping means and said bimetal spring is visible.

2. A fluid coupling according to claim 1, wherein said bracket has a T-shape, and said rubber element is fixed to the top of said T-shape of said bracket.

3. A fluid coupling according to claim 1, wherein said bracket has an L-shape, and said rubber element is fixed to a leg of said bracket.

4. A fluid coupling according to claim 1, wherein said bracket has a Z-shape and said rubber element is fixed to a leg of said bracket.

5. A fluid coupling comprising:
   a casing supported by a drive shaft;
   a cover fixed to said casing to form a chamber;
   a partition plate having a passage and dividing said chamber into a fluid reservoir and an operation chamber;
   a rotor disposed in said operation chamber;
   a valve plate operable to selectively open and close said passage in said partition plate;
   a stud supported by said cover and fixed to said valve plate such that rotation of said stud operates said valve plate; and
   a bimetal spring having an inner end fixed to said stud and an outer end fixed to said cover for rotating said stud in response to temperature changes; and
   damping means disposed between said cover and said bimetal spring at a position radially outward of said spring with respect to the axis of rotation of said rotor, said damping means comprising a rubber element fixed to said bimetal spring and a projection on said cover at a position sufficiently close to said rubber element that said rubber element radially engages said projection at least during vibration of said bimetal spring.

* * * * *